United States Patent
Pinturi et al.

(10) Patent No.: US 8,365,885 B2
(45) Date of Patent: Feb. 5, 2013

(54) EMERGENCY BRAKE

(75) Inventors: Lucio Pinturi, Campodarsego (IT); Giorgio Pilati, Creazzo (IT)

(73) Assignee: Carraro S.p.A., Campodarsego (IT)

( * ) Notice: Subject to any disclaimer, the term of this patent is extended or adjusted under 35 U.S.C. 154(b) by 446 days.

(21) Appl. No.: 12/596,999

(22) PCT Filed: Apr. 22, 2008

(86) PCT No.: PCT/IT2008/000283
§ 371 (c)(1),
(2), (4) Date: Oct. 22, 2009

(87) PCT Pub. No.: WO2008/129588
PCT Pub. Date: Oct. 30, 2008

(65) Prior Publication Data
US 2010/0206672 A1      Aug. 19, 2010

(30) Foreign Application Priority Data
Apr. 23, 2007  (IT) .............................. PD2007A0150

(51) Int. Cl.
*F16D 55/40*  (2006.01)
(52) U.S. Cl. ................................. 188/264 F; 188/264 D
(58) Field of Classification Search ................. 188/71.5, 188/71.6, 160, 264 B, 264 D, 264 E, 264 F, 188/264 P, 264 R; 192/85.37, 85.63, 85.57, 192/113.35; 303/116.3
See application file for complete search history.

(56) References Cited

U.S. PATENT DOCUMENTS

| | | | | | |
|---|---|---|---|---|---|
| 2,775,328 | A | * | 12/1956 | Yokel ............................. | 192/57 |
| 2,837,192 | A | * | 6/1958 | Dunkelow ................. | 192/85.29 |
| 3,696,893 | A | * | 10/1972 | Koivunen ................. | 188/264 E |
| 3,924,712 | A | * | 12/1975 | Stirling et al. ............. | 188/264 F |
| 3,960,249 | A | * | 6/1976 | Stirling ....................... | 188/264 F |
| 5,050,939 | A | * | 9/1991 | Middelhoven et al. ......... | 303/71 |
| 5,469,943 | A | * | 11/1995 | Hill et al. .................... | 188/264 F |
| 5,941,358 | A | * | 8/1999 | Hosseini et al. ............. | 192/85.63 |
| 6,202,814 | B1 | * | 3/2001 | Braford, Jr. ................. | 192/70.12 |
| 6,543,222 | B1 | | 4/2003 | Case et al. | |
| 7,007,782 | B2 | * | 3/2006 | Anwar et al. ............... | 192/70.12 |

FOREIGN PATENT DOCUMENTS

| | | |
|---|---|---|
| GB | 1291722 | 10/1972 |
| WO | WO 00/66906 | 11/2000 |

* cited by examiner

*Primary Examiner* — Robert A Siconolfi
*Assistant Examiner* — Stephen Bowes
(74) *Attorney, Agent, or Firm* — Stradley Ronon Stevens & Young, LLP

(57) ABSTRACT

An emergency brake. The emergency brake includes a pack of disks and counter-disks. A resilient actuator acts on the pack to push the disks and counter-disks into a braking condition. A piston acts on the pack in opposition to the resilient actuator in order to disable braking. A hydraulic circuit has a pressurized hydraulic fluid controlling the piston, which can be activated to actuate the piston in a condition releasing braking of the pack. The hydraulic circuit also has a branch delivering actuator fluid to the braking pack to lubricate and cool the braking pack when the circuit is deactivated.

7 Claims, 3 Drawing Sheets

EMERGENCY BRAKE

RELATED APPLICATION

This application is a U.S. national phase application of International Application No. PCT/IT2008/000283 filed on Apr. 22, 2008.

TECHNICAL SCOPE

This invention relates generally to an emergency brake and, in particular but not exclusively, to an emergency brake for applications relating to axle transmission for vehicles.

TECHNOLOGICAL BACKGROUND

In this context emergency brakes which incorporate a friction braking element associated with a rotating member of the transmission are known. Typically, although not exclusively, such braking elements comprise a pack of alternating disks and counter-disks in which the disks are fixed to the rotating member while the counter-disks are fixed to a stationary member.

Provision is made for the use of a resilient braking device to apply a thrust load on the pack of disks and counter-disks so as to compress them in order to transmit a braking torque to the rotating member. This braking device can be subjected to the action of a hydraulic system with an opposing load which is sufficient to cancel out the action of the thrust load, enabling the disks and counter-disks to move apart and counteract the braking torque. When the hydraulic system is active, relative rotation between the disks and counter-disks is free.

In practice, when the engine is not running the brake is activated by the force exerted on the braking pack of disks and counter-disks by one or more springs. When the engine is running this force is counteracted by the thrust of a hydraulic piston acting on those springs. The brake comes into action when a fault in the vehicle causes the engine to stop and as a consequence pressure is lost in the hydraulic system and the thrust of the hydraulic piston is reduced to nothing.

The main disadvantage of such devices lies in the fact that when the abovementioned emergency brake is activated the kinetic energy of the vehicle is dissipated as heat in the braking pack, in a time of typically between 2 and 5 seconds. Again, for safety reasons, it is typically required that the brake should be able to act several times consecutively without suffering damage or significant loss of performance.

SUMMARY OF THE INVENTION

The problem considered by this invention is that of developing an emergency brake which is structurally and functionally designed to reduce the quantity of heat absorbed by the brake so that the latter will operate safely even for several consecutive times.

This and other problems which will be more apparent below are considered and resolved according to the invention by an emergency brake including a pack of disks and counter-disks; a resilient actuator acting on the pack to push the disks and counter-disks into a braking condition; a piston acting on the pack in opposition to the resilient actuator in order to disable braking; and a hydraulic circuit. The hydraulic circuit has (a) a pressurized hydraulic fluid controlling the piston, the circuit being activated in order to actuate the piston in a condition in which braking of the pack is released, and (b) a branch delivering the fluid to the braking pack to lubricate and cool the braking pack when the circuit is deactivated.

It is to be understood that both the foregoing general description and the following detailed description are exemplary, but are not restrictive, of the invention.

BRIEF DESCRIPTION OF THE DRAWINGS

Features and advantages of the invention will be more apparent from the following detailed description of preferred embodiments illustrated indicatively and without limitation with reference to the appended drawings in which.

It is emphasized that, according to common practice, the various features of the drawings are not to scale. On the contrary, the dimensions of the various features are arbitrarily expanded or reduced for clarity.

PREFERRED EMBODIMENTS OF THE INVENTION

Figure 1:
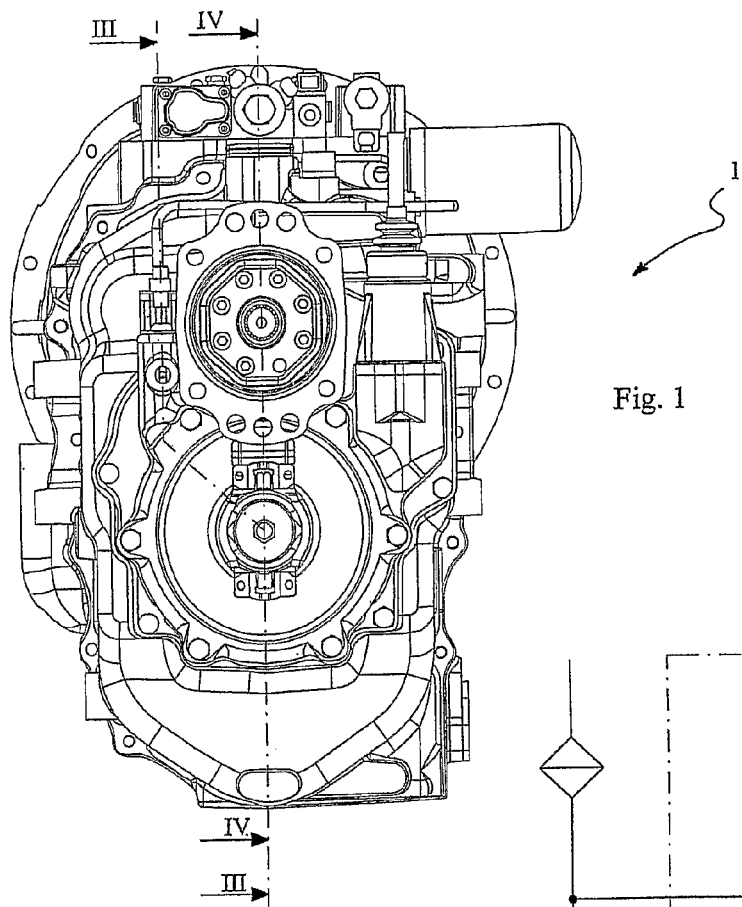
FIG. 1 is a side view of a transmission for vehicles incorporating an emergency brake according to the invention.
Figure 2:
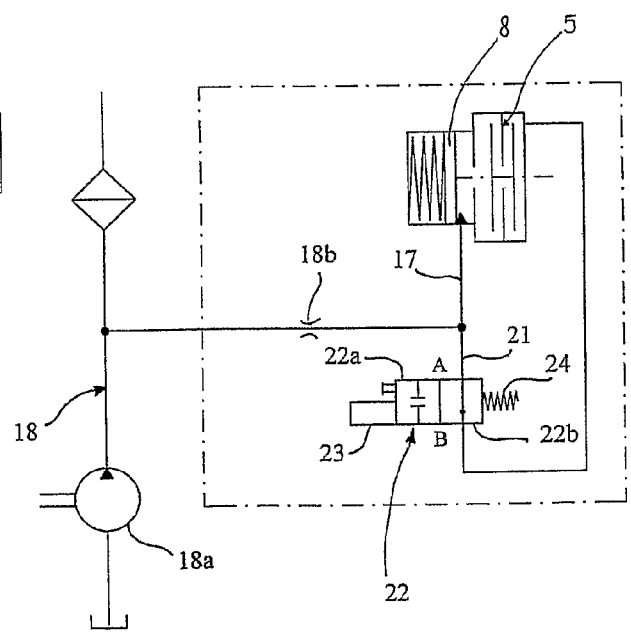
FIG. 2 is a diagram of the hydraulic circuit serving the brake shown in FIG. 1.
Figure 3:
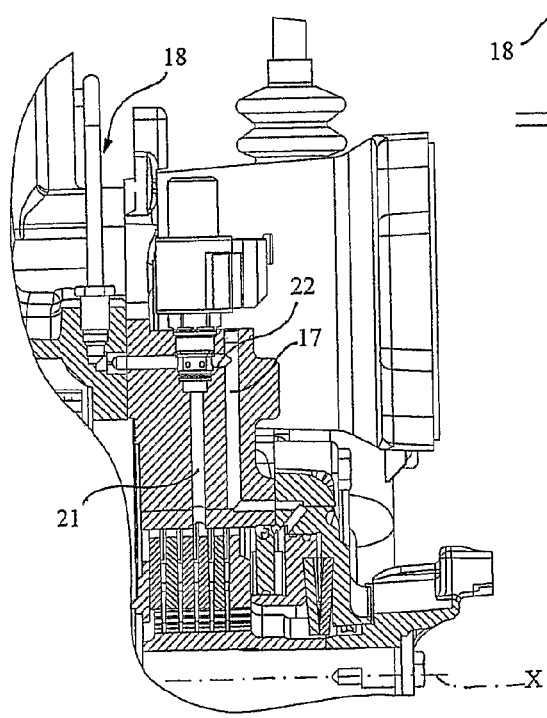
FIG. 3 is a partial view of a detail of the invention shown in cross-section along the line III-III in FIG. 1.
Figure 4:
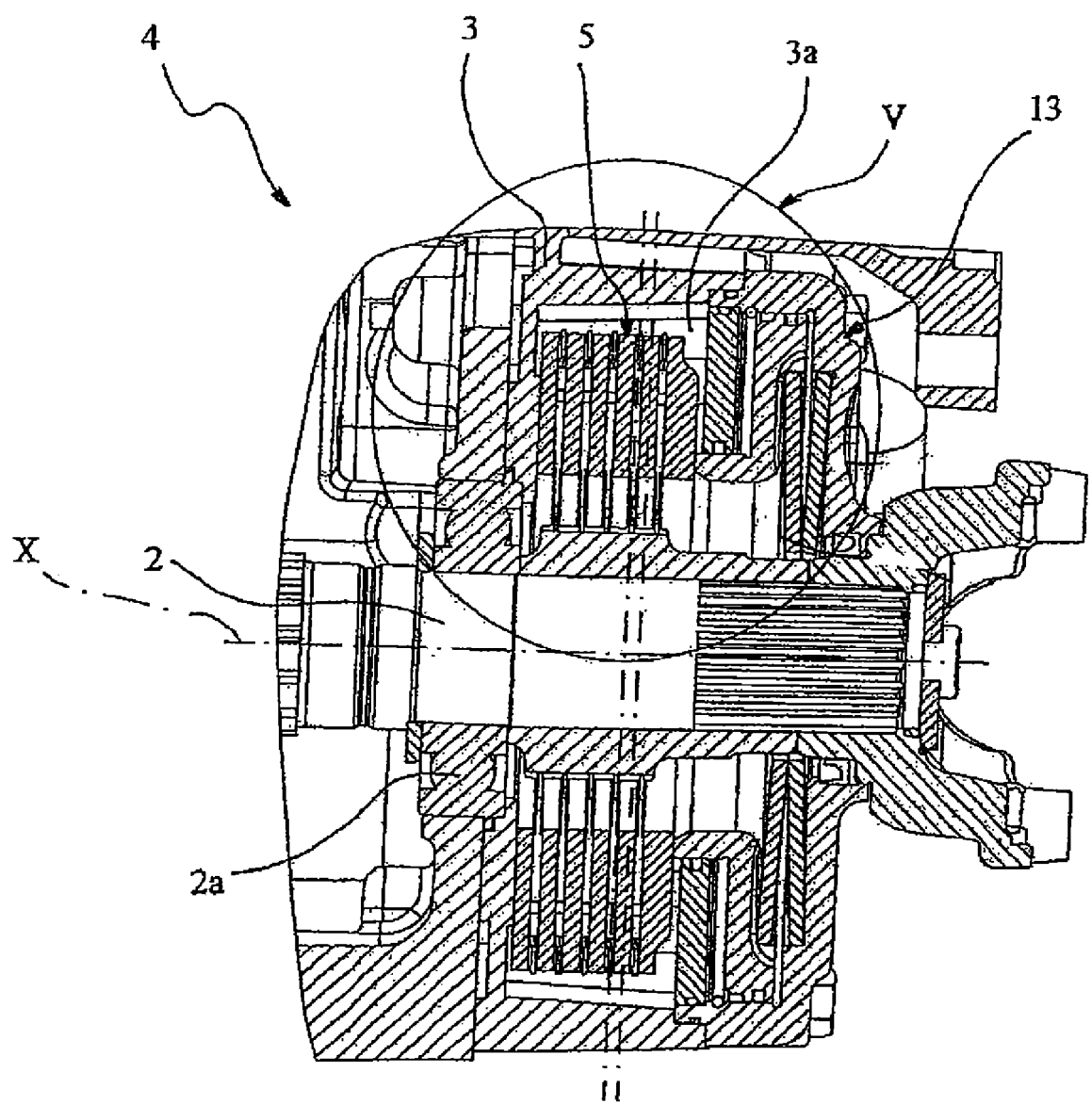
FIG. 4 is a partial view of a detail of the invention shown in cross-section along the line IV-IV in FIG. 1.
Figure 5:
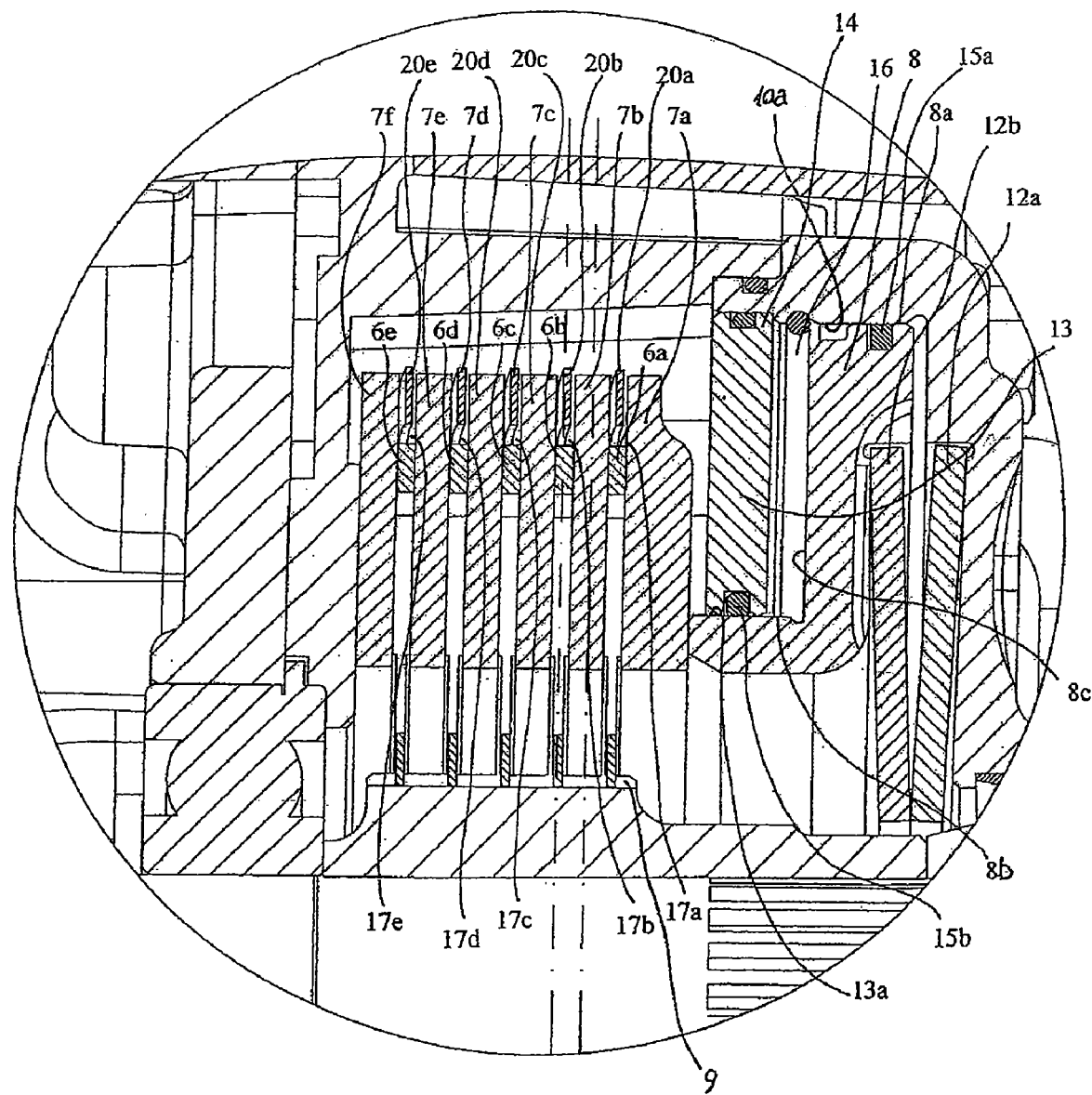
FIG. 5 is a view of detail V in FIG. 4.

In FIG. 1, reference 1 indicates as a whole an axle for vehicles incorporating a transmission shaft 2 extending along an axis X and an emergency brake 4 incorporating a bell-shaped enclosure 3. Transmission shaft 2 is attached to enclosure 3 by a ball bearing 2a and is therefore free to rotate with respect to enclosure 3.

Emergency brake 4 comprises a braking pack 5 housed in a chamber 3a of enclosure 3 and immersed in a bath of oil. Braking pack 5 comprises disks 6a,b,c,d,e and counter-disks 7a,b,c,d,e,f. Each of disks 6a,b,c,d,e is located between a pair of counter-disks 7a,b,c,d,e,f.

In the example illustrated, provision is made for a braking pack with five disks 6a,b,c,d,e and six counter-disks 7a,b,c,d,e,f, although the number of such components may be varied according to need and according to the braking power which it is desired to develop. Theoretically it is possible for pack 5 to comprise a single disk 6a located between two counter-disks 7a,b.

Disks 6a,b,c,d,e rotate as one piece with transmission shaft 2 through a key coupling 9 between the surface of shaft 2 and a hole passing through the center of each of disks 6a,b,c,d,e. Key coupling 9 allows disks 6a,b,c,d,e to move along the X axis, but locks them in rotation with transmission shaft 2. Each of counter-disks 7a,b,c,d,e,f is fitted into enclosure 3 with play and is provided with four radial projections facing enclosure 3 and movably attached to four corresponding grooved seats parallel to the X axis provided in enclosure 3. The coupling between the radial projections and the grooved seats makes counter-disks 7a,b,c,d,e,f of one piece with enclosure 3 in relation to rotation about the X axis and free to move along the X axis. Between each pair of axially consecutive counter-disks 7a,b,c,d,e,f there is defined an annular seat 17a,b,c,d,e bounded in the radial direction by corresponding disks 6a,b,c,d,e and enclosure 3. A corresponding resilient member 20a,b,c,d,e, preferably configured as a corrugated spring, is housed in each of annular seats 17a,b,c,d,e. Each of resilient members 20a,b,c,d,e acts between two consecutive counter-disks 7a,b,c,d,e,f to press them apart.

Resilient members 20a,b,c,d,e have an outer diameter which is virtually identical to the inner diameter of enclosure 3, being connected thereto with slight play.

Emergency brake 4 comprises a resilient actuator, including cup springs 12a,b acting on braking pack 5 to push disks 6a,b,c,d,e and counter-disks 7a,b,c,d,e,f into a braking position.

Cup springs 12a,b, fitted between a cover of enclosure 3 and an actuator piston 8, are fitted and preloaded in such a way as to exert a compression force between disks 6a,b,c,d,e and counter-disks 7a,b,c,d,e,f through actuator piston 8. As a result of this compression force, disks 6a,b,c,d,e and counter-disks 7a,b,c,d,e,f are placed in mutual sliding contact so as to transmit a braking torque to disks 6a,b,c,d,e by friction. As a result of key coupling 9, this braking torque is transmitted to transmission shaft 2.

Actuator piston 8, which is coaxial with respect to transmission shaft 2, is of annular shape and is mounted to move with restriction on enclosure 3. Actuator piston 8 abuts against first counter-disk 7a and acts on pack 5 in opposition to cup springs 12a,b to disable braking.

Actuator piston 8 comprises two cylindrical surfaces 8a,b between which there is defined a shoulder 8c. Surface 8a is connected with play to a surface 10a associated therewith provided in the cover of enclosure 3. The coupling between surfaces 8a and 10a allows actuator piston 8 to move along the X axis.

Surface 8b, of smaller diameter than surface 8a, lies adjacent to first counter-disk 7a. At the extremity of the cover facing the braking pack 5 there is keyed an annular disk 13, abutting against a shoulder 14 adjacent to surface 10a. Disk 13 is provided with a through hole 13a connected with play to surface 8b of actuator piston 8.

In enclosure 3 an annular chamber 16 connected through a conduit 17 to a hydraulic system 18 which can be activated by a pump 18a in order to pass pressurized oil into chamber 16 is provided between surfaces 8a, 10a, shoulder 8c and disk 13. Hydraulic system 18 comprises a flow limiter 18b intermediate between pump 18a and chamber 16 to deliver a constant flow of oil to the latter. Pump 18a is driven by a transmission member (not shown) connected to the vehicle's drive shaft.

Through the pressure of oil on shoulder 8c hydraulic system 18 can exert a hydraulic force on piston 8 to cancel out the compression force exerted by cup springs 12a,b and the braking torque is consequently transmitted to disks 6a,b,c,d,e.

Two annular seals 15a,b housed in two corresponding seats provided in surface 8a and on the surface of hole 13a ensure a seal between actuator piston 8 and enclosure 3, preventing oil from seeping from chamber 16.

A branch (which may be a length of pipe) 21 is provided in hydraulic system 18 to connect conduit 17 with chamber 3a. Branch 21 is intercepted by a valve which, when close, directs pressurized fluid to actuator piston 8. This valve is preferably an electrically operated valve 22 which can be set in two positions 22a,b, closed and open respectively, and has two ports (both an inlet and an outlet). Valve 22 is set to closed position 22a through a solenoid actuator 23 powered by the vehicle's electrical circuit. Valve 22 is also under pressure from a return spring 24 in open position 22b.

When hydraulic system 18 is active, branch 21 is intercepted by closed valve 22 so as to direct the pressurized flow to piston 8 through conduit 17. When pump 18a does not feed hydraulic system 18, valve 22 is activated and opened to allow the free flow of compressed fluid to braking pack 5.

The operation of the emergency brake 4 according to this invention is as follows. When the vehicle's engine is running, hydraulic system 18 is active, and pump 18a is in operation.

Chamber 16 is fed with pressurized oil generating a thrust on piston 8 which is greater than that exerted by cup springs 12a,b, thus freeing relative rotation between the disks 6a,b,c,d,e and counter-disks 7a,b,c,d,e,f. When the engine is running, solenoid actuator 23 is powered and valve 22 is as a consequence set in the closed position 22a.

When the engine is not running, pump 18a is not fed and as a consequence hydraulic system 18 is inactive because of the sudden pressure drop in conduit 17 and chamber 16. The action of cup springs 12a,b through piston 8 causes pack 5 to move into the braking position with consequent application of the braking torque to transmission shaft 2. At the same time, with solenoid actuator 23 not powered, return spring 24 moves valve 22 into the open position 22b. The residual pressure in hydraulic circuit 18 and the pressure of the oil compressed by piston 8 in chamber 16 are sufficient to feed chamber 3a through branch 21 in the few seconds necessary to stop the vehicle, restricting the quantity of heat absorbed by braking pack 5.

The invention thus fulfils the intended objects with respect to the cited known art, and at the same time provides further advantages. These include the fact that resilient members 20a,b,c,d,e cause counter-disks 7a,b,c,d,e,f to move away from each other when the emergency brake is not active, thus reducing the loss of power due to friction in pack 5.

Although illustrated and described above with reference to certain specific embodiments and examples, the present invention is nevertheless not intended to be limited to the details shown. Rather, various modifications may be made in the details within the scope and range of equivalents of the claims and without departing from the spirit of the invention.

The invention claimed is:

1. An emergency brake for a vehicle having an engine, the brake comprising:
   a pack of disks and counter-disks;
   a resilient actuator acting on the pack to push the disks and counter-disks into a braking condition;
   a piston acting on the pack in opposition to the resilient actuator in order to disable braking;
   a hydraulic circuit having (a) a pressurized hydraulic fluid controlling the piston, the circuit being activated in order to actuate the piston in a condition in which braking of the pack is released, and (b) a branch delivering the fluid to the braking pack to lubricate and cool the braking pack when the circuit is deactivated, the hydraulic circuit being activated when the engine of the vehicle is running and deactivated when the engine is not running: and
   a valve which is in a closed position when the hydraulic circuit is activated and which is in an open position when the hydraulic circuit is deactivated;
   wherein the valve, when in the closed position, intercepts the branch delivering the fluid to the braking pack so as to direct pressurized fluid to the piston and, when in the open position, allows a free flow of compressed fluid from the piston to the braking pack, thus pressurizing the branch by the residual pressure and the resilient action of the resilient actuator.

2. The brake according to claim 1, in which the valve is a directional electrically operated valve with two positions, closed and open, and both an inlet and an outlet.

3. The brake according to claim 2, further comprising an electrically powered actuator setting the valve in the closed position.

4. The brake according to claim 2, further comprising a return spring setting the valve in the open position.

5. The brake according to claim 2, in which the inlet and outlet of the valve are in communication with the piston and the braking pack, respectively.

6. The brake according to claim 1, in which the hydraulic circuit is activated by a pump.

7. The brake according to claim 1, in which the resilient actuator includes at least one cup spring.

* * * * *